United States Patent [19]

Minevski et al.

[11] Patent Number: 5,985,179
[45] Date of Patent: Nov. 16, 1999

[54] CORROSION INHIBITOR FOR ALKANOLAMINE UNITS

[75] Inventors: Ljiljana V. Minevski, The Woodlands; Ann L. Lambousy, Spring, both of Tex.

[73] Assignee: BetzDearborn, Inc., Trevose, Pa.

[21] Appl. No.: 09/140,581

[22] Filed: Aug. 27, 1998

Related U.S. Application Data

[62] Division of application No. 08/920,278, Aug. 22, 1997.

[51] Int. Cl.$^6$ ............... C09K 3/00; C10G 1/18; C23F 11/06; C07C 7/20; C07C 7/17
[52] U.S. Cl. ............... 252/395; 208/47; 422/13; 585/2; 585/856
[58] Field of Search .............. 252/395; 208/47; 422/13; 585/2, 856

[56] References Cited

U.S. PATENT DOCUMENTS

| | | |
|---|---|---|
| 2,377,966 | 6/1945 | Reed . |
| 3,133,028 | 5/1964 | Channabasappa . |
| 3,345,381 | 10/1967 | Campbell . |
| 4,100,100 | 7/1978 | Clouse et al. ............ 252/189 |
| 4,102,804 | 7/1978 | Clouse et al. ............ 252/189 |
| 4,116,812 | 9/1978 | Godar ............... 208/48 AA |
| 4,159,901 | 7/1979 | Beestman et al. . |
| 4,250,046 | 2/1981 | Przybylinski ............ 508/530 |
| 4,370,256 | 1/1983 | Oakes ................. 252/391 |
| 4,430,196 | 2/1984 | Niu ................... 208/47 |
| 4,431,563 | 2/1984 | Krawcyzk et al. .......... 252/189 |
| 4,446,119 | 5/1984 | DuPart et al. .......... 252/189 X |
| 4,490,275 | 12/1984 | Niu ................... 252/189 |
| 4,536,302 | 8/1985 | Augsburger et al. ........ 507/211 |
| 4,541,946 | 9/1985 | Jones et al. ............ 252/189 |
| 4,595,723 | 6/1986 | Henson et al. .......... 252/189 X |
| 4,596,849 | 6/1986 | Henson et al. .......... 524/398 |
| 4,636,297 | 1/1987 | Uchiyama et al. ........ 208/48 AA |
| 4,737,166 | 4/1988 | Matson et al. ............ 95/44 |
| 4,808,765 | 2/1989 | Pearce et al. . |
| 4,994,502 | 2/1991 | Markovs et al. .......... 521/157 |
| 5,024,774 | 6/1991 | Salomon ............... 508/251 |
| 5,149,725 | 9/1992 | Genz et al. ............ 521/110 |
| 5,345,030 | 9/1994 | Sun et al. ............... 585/2 |
| 5,368,774 | 11/1994 | Borgard et al. .......... 252/391 |
| 5,369,163 | 11/1994 | Chiou et al. . |
| 5,531,937 | 7/1996 | Minevski et al. .......... 252/394 |
| 5,589,149 | 12/1996 | Garland et al. . |

FOREIGN PATENT DOCUMENTS

| | | |
|---|---|---|
| 298638 | 5/1972 | U.S.S.R. . |
| 655410 | 4/1979 | U.S.S.R. . |
| 1613430 | 12/1990 | U.S.S.R. . |

*Primary Examiner*—D. Gabrielle Brouillette
*Assistant Examiner*—Monique T. Cole
*Attorney, Agent, or Firm*—Steven D. Boyd

[57] ABSTRACT

The corrosion of metals in contact with an aqueous alkanolamine solution in an acid gas removal unit is inhibited by adding a corrosion inhibiting amount of an alkanemonothiol or alkanedithiol compound to the aqueous alkanolamine solution. The alkanemonothiol and alkanedithiol compounds are useful for inhibiting the corrosion of metals in both the acid gas rich and lean portions of the acid gas removal unit.

7 Claims, No Drawings

CORROSION INHIBITOR FOR ALKANOLAMINE UNITS

This is a divisional of application Ser. No. 08/920,278 filed Aug. 22, 1997.

FIELD OF THE INVENTION

The present invention relates to methods of inhibiting corrosion in aqueous alkanolamine solutions and compositions for inhibiting corrosion in aqueous alkanolamine solutions. More particularly, the present invention relates to methods of inhibiting corrosion of metals in contact with aqueous alkanolamine solutions in acid gas removal amine units using alkanemonothiol and alkanedithiol compounds.

BACKGROUND OF THE INVENTION

The conditioning of naturally occurring liquid and gas streams by absorbing acid gases such as $CO_2$ and $H_2S$ in an absorbent solution is a well known commercial practice. Acid gas removal is commonly practiced in the oil refining, natural gas recovery, ammonia plant and wood pulp industries. For example, when crude oil and natural gas are removed from a formation they frequently contain $CO_2$ or $H_2S$ (acid gases). Acid gases are removed from the hydrocarbon in an acid gas removal amine system (amine unit). Amine units are typically constructed of carbon steel and operate at temperatures of from about 110° to about 300° F., at pressures of from about 10 to about 500 psig and with less than about 10 ppm of oxygen present as an undesirable contaminant in the aqueous alkanolamine solution. An amine unit utilizes an alkanolamine such as monoethanolamine (MEA), diethanolamine (DEA), methyldiethanolamine (MDEA), diisopropylamine (DIPA), and diglycolamine (DGA) in an aqueous solution. The hydrocarbon containing acid gases are contacted with the aqueous amine solution in a tray or packed absorber where the amine reacts with the acid gases thereby removing them from the hydrocarbon and forming an aqueous amine solution containing the absorbed acid gases (rich stream). The amine-acid gas reaction is later reversed in a plate or packed stripper resulting in an acid gas stream and a reusable aqueous amine solution (lean stream).

Amine units present a variety of corrosion control problems. Unreacted carbon dioxide dissolved in the aqueous alkanolamine solution forms acid species which are corrosive to metals. Oxygen can enter an amine unit through storage tanks, sumps, surge vessels, and the like and attack metals causing corrosion. Oxygen also can oxidize the alkanolamine. Oxidation and degradation products of alkanolamines can cause metal corrosion. Efforts to control corrosion in amine units usually focus on the use of metallurgy, minimization of acid gas flashing, filtration, stress relieving, process controls and corrosion inhibitors such as metal passivating agents. However, environmental and safety concerns have limited the practicality of using some materials such as nickel, cobalt, calcium, copper, chromium, zinc, tin, aluminum, magnesium and cyano compounds and the like as corrosion inhibiting agents. Since corrosion, if left untreated, can cause shut-down of an amine unit, corrosion control is a very important consideration. In addition, most corrosion control efforts have focused on treating the rich stream of the amine unit. However, the lean sections of amine units also experience corrosion.

Therefore, a need exists for compositions which when added to an aqueous alkanolamine solution in an acid gas removal amine unit inhibits corrosion of metals in contact with the aqueous alkanolamine solutions and which are effective for inhibiting corrosion in both the rich and lean portions of the amine unit.

Accordingly, it is an object of the present invention to provide compounds for inhibiting corrosion of metals in contact with aqueous alkanolamine solutions.

It is also an object of this invention to provide compounds which are effective for inhibiting metal corrosion in both the rich and lean portions of amine units containing aqueous alkanolamine solutions.

It is an additional object of the present invention to provide aqueous acid gas removal solutions for use in amine units which are inhibited against acid gas promoted corrosion of metals.

It is yet another object of this invention to provide a method for inhibiting corrosion of metals in contact with aqueous alkanolamine solutions in amine acid gas removal units.

PRIOR ART

U.S. Pat. No. 3,133,028 to Kenhere discloses that corrosion of metals in contact with water can be inhibited by the use of water-soluble hexavalent chromium compounds in conjunction with water-soluble thiocyanates, and/or water soluble thiourea compounds of the type represented by the formula:

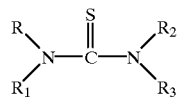

where R, $R_1$, $R_2$ and $R_3$ are selected from the group consisting of hydrogen, alkali metal, and alkyl radicals containing from 1 to 4 carbon atoms. Zinc compounds are also disclosed as corrosion inhibiting compounds when used in conjunction with water-soluble hexavalent chromium.

U.S. Pat. No. 4,100,100 to Clouse et al. discloses the corrosion of iron and steel by an aqueous sour gas conditioning solution to remove $CO_2$ from a gas stream is inhibited by a combination of a quaternary pyridinium salt and an organic thioamide or water-soluble thiocyanate and a water-soluble cobalt salt. The patent discloses that the cobalt compound the thio compound or the pyridinium salt alone will provide no inhibition or only partial inhibition.

U.S. Pat. No. 4,102,804 to Clouse et al. discloses the corrosion of iron and steel in an aqueous sour gas conditioning system is inhibited by a combination of a quaternary pyridinium salt and an organic thioamide, a water-soluble sulfide or a water-soluble thiocyanate. The patent also discloses that either the thio compound or the pyridinium salt alone will provide no inhibition or only partial inhibition.

U.S. Pat. No. 4,446,119 to DuPont et al. discloses a corrosion inhibited composition containing a gas conditioning solution such as an alkanolamine with water or with organic solvents and with soluble thiocyanate compounds, soluble trivalent bismuth compounds with or without soluble divalent nickel or cobalt compounds.

U.S. Pat. No. 4,431,563 to Krawcyzk et al. discloses that corrosion of ferrous metals in gas conditioning apparatus is inhibited by using a gas conditioning solution such as aqueous alkanolamines which contain thionitrogen compounds such as metal thiocyanates or thioamides. The patent discloses that metals such as cobalt, nickel, calcium, copper, chromium, zinc, tin, aluminum and magnesium will dissolve from the equipment after a few days of recycling the gas conditioning solution or these metals may be introduced into the gas conditioning solution as additives. The metals in the gas conditioning solution act as a synergist with the thionitrogen compounds to inhibit metal corrosion in the gas conditioning apparatus.

U.S. Pat. No. 4,541,946 to Jones et al. discloses a corrosion inhibitor composition useful for preventing corrosion by solvents used in treating sour gas streams comprising a quaternary pyridinium salt, a surface-active and/or a thio compound and a water soluble nickel compound. The thio compound can be an organic thioamide or preferably a water-soluble thiocyanate. The patent also discloses that the nickel compound, the thio compound, the surface-active compound or the pyridinium salt, when used alone, provide little or no corrosion inhibition.

U.S. Pat. No. 4,595,723 to Henson et al. discloses a thiourea-amine-formaldehyde based polymer used in combination with a nickel (II) ion for inhibiting corrosion of ferrous metals and its alloys in gas conditioning service using aqueous monoethanolamine to scrub carbon dioxide.

U.S. Pat. No. 4,596,849 to Henson et al. discloses a thiourea-amine-formaldehyde based polymer used in combination with a copper (II) ion for inhibiting corrosion of ferrous metals and its alloys in gas conditioning service using aqueous monoethanolamine to scrub carbon dioxide containing oxygen.

U.S. Pat. No. 5,531,937 to Minevski et al. discloses non-sulfur based compositions comprising water soluble n-alkyl morpholine, saturated dicarboxylic acid and optionally alkanolamine and optionally surfactants for inhibition of ferrous metal corrosion in oxygen-free solutions.

SUMMARY OF THE INVENTION

To achieve the foregoing objects, the present invention provides compositions for inhibiting corrosion of metals in contact with aqueous alkanolamine solutions. The compositions comprise alkanemonothiols and alkanedithiols, effective for inhibiting metal corrosion in aqueous alkanolamine solutions and having the formula:

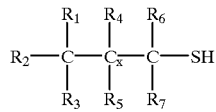

wherein x is 2–8; $R_1$ is independently H, SH, $C_1$ to $C_6$ alkyl, $C_6$ to $C_{10}$ aryl, $C_3$ to $C_{10}$ cycloalkyl, or $C_7$ to $C_{12}$ aralkyl; $R_{2-7}$ are independently H, $C_1$ to $C_6$ alkyl, $C_6$ to $C_{10}$ aryl, $C_7$ to $C_{12}$ cycloalkyl, or $C_7$ to $C_{12}$ aralkyl; and wherein the total number of carbon atoms in the compound is less than seventeen.

The invention also provides aqueous acid gas removal solutions inhibited against acid gas promoted corrosion of metals. The solutions are comprised of an alkanolamine; at least one alkanemonothiol and/or alkanedithiol compound, effective as a corrosion inhibitor, and having the formula:

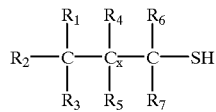

wherein x is 2–8; $R_1$ is independently H, SH, $C_1$ to $C_6$ alkyl, $C_6$ to $C_{10}$ aryl, $C_3$ to $C_{10}$ cycloalkyl, or $C_7$ to $C_{12}$ aralkyl; $R_{2-7}$ are independently H, $C_1$ to $C_6$ alkyl, $C_6$ to $C_{10}$ aryl, $C_3$ to $C_{10}$ cycloalkyl, or $C_7$ to $C_{12}$ aralkyl, and wherein the total number of carbon atoms in the compound is less than seventeen; and water.

The invention further provides a method for inhibiting corrosion of metals in contact with aqueous alkanolamine solutions. The method comprises adding an amount of alkanemonothiol and/or alkanedithiol compound having the formula:

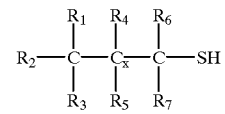

wherein x is 2–8; $R_1$ is independently H, SH, $C_1$ to $C_6$ alkyl, $C_6$ to $C_{10}$ aryl, $C_3$ to $C_{10}$ cycloalkyl, or $C_7$ to $C_{12}$ aralkyl; $R_{2-7}$ are independently H, $C_1$ to $C_6$ alkyl, $C_6$ to $C_{10}$ aryl, $C_3$ to $C_{10}$ cycloalkyl, or $C_7$ to $C_{12}$ aralkyl; and the total number of carbon atoms in the compound is less than seventeen; to an aqueous alkanolamine solution, sufficient to establish a concentration of the thiol compound in the aqueous solution which is effective for the purpose of inhibiting metal corrosion in an amine acid gas removal unit.

DETAILED DESCRIPTION OF THE INVENTION

In accordance with the present invention, a composition and method for inhibiting corrosion of metals in aqueous alkanolamine solutions is provided. The present inventors have discovered that alkanemonothiol or alkanedithiol compounds having the formula:

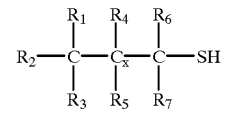

wherein x is 2–8; $R_1$ is independently H, SH, $C_1$ to $C_6$ alkyl, $C_6$ to $C_{10}$ aryl, $C_3$ to $C_{10}$ cycloalkyl, or $C_7$ to $C_{12}$ aralkyl; $R_{2-7}$ are independently H, $C_1$ to $C_6$ alkyl, $C_6$ to $C_{10}$ aryl, $C_3$ to $C_{10}$ cycloalkyl, or $C_7$ to $C_{12}$ aralkyl; and wherein the total number of carbon atoms in the compound is less than seventeen; when added to an aqueous alkanolamine solution, significantly inhibits corrosion of metals in contact with the alkanolamine solution in acid gas removal amine units. The thiol compounds are effective for inhibiting metal corrosion in both the rich and lean portions of acid gas removal equipment.

The inventors believe that cyclohexanethiol; 3-methyl-1-butanethiol; 1-heptanethiol; 1-octanethiol; 1-nonanethiol; benzylthiol; 3-phenyl-1-butanethiol; 2,5-dimethyl-1,6-hexanedithiol; 1,4-cyclohexanedithiol; 1,4-pentanedithiol; 2,5-hexanedithiol; 2,5-dimethyl-2,5-hexanedithiol; 1,4-diphenyl-1,4-butanedithiol; 1,4-cyclohexyl-1,4-butanedithrol are thiol compounds which would be effective for the practice of this invention.

The preferred alkanemonothiols are 1-hexanethiol; 1decanethiol and 1-dodecanethiol. The preferred alkanedithiols are 1,6-hexanedithiol and 1,8-octanedithiol. The thiol compounds of this invention can be added neat to the alkanolamine solution in an amine unit or can be added diluted with water, an alkanol, and/or with an alkanolamine solution. Preferably, the invention thiol compounds are diluted in an aqueous alkanol solution prior to addition to an aqueous alkanolamine solution in an amine unit. It is expected that any water soluble alkanol in which thiol compounds are soluble will be suitable for the practice of this invention, such as $C_1$ to $C_5$ alkanols. The preferred alkanol is isopropanol.

The thiol compounds of this invention are effective when added to an aqueous alkanolamine solution individually and are also expected to be effective when added as blends of alkanemonothiols, blends of alkanedithiols, and blends of alkanemonothiols and alkanedithiols.

The thiol compounds of this invention are also effective for inhibiting corrosion in aqueous alkanolamine solutions which are substantially free of materials such as passivating agents including nickel, cobalt, calcium, copper, chromium, zinc, tin, aluminum, magnesium and cyano compounds.

As used herein, "substantially free of" means that less than about 5 ppm of a material is present in the aqueous alkanolamine solution as an undesirable contaminant.

The amount of corrosion inhibiting thiol compound of this invention added to an aqueous alkanolamine solution in an acid gas removal amine unit to inhibit corrosion of metals exposed to the aqueous alkanolamine solution will vary depending on the operating conditions in the amine unit. However, it is expected that from about 5 to about 1000 parts of the invention thiol compounds per million parts alkanolamine solution (ppm) will be effective to inhibit corrosion of metals in contact with an aqueous alkanolamine solution within an amine unit. The preferred treatment level is from about 25 to about 500 ppm and the most preferred treatment level is from about 25 ppm to about 100 ppm of corrosion inhibiting thiol compound in the aqueous alkanolamine solution.

On a weight percent basis, the corrosion inhibited alkanolamine solution of this invention in the alkanolamine unit is comprised of about 15 to 75 weight percent alkanolamine, about 25 to 85 weight percent water and less than about 1 weight percent thiol compound with the proviso that the sum of the weight percentages equals 100 weight percent.

In order to show the efficacy of inhibiting corrosion of metals in contact with aqueous alkanolamine solutions, various tests were performed. The results are presented herein for purposes of illustration and not limitation.

EXAMPLE I

A standard three electrode system was used to evaluate the corrosion inhibiting effect of various amounts of the invention corrosion inhibitor on metal in contact with an aqueous alkanolamine solution.

The corrosion inhibitor contained 11.3 weight percent 1,6-hexanedithiol, 79.5 weight percent isopropanol and 9.2 weight percent water.

Test conditions simulated conditions in the lean portions of an amine unit by using an alkanolamine which had been purged with argon. Rich portions of an amine unit were simulated by using an alkanolamine purged with $CO_2$ or a mixture of alkanolamine and $Na_2S$ purged with $CO_2$. Various alkanolamine acid gas removal fluids containing acidic materials were used in the tests.

Mild steel 1018 electrodes in the form of a disk were used as the metal simulating the metal in amine unit equipment. The temperature ranged from about 190° F. to 250° F. Gases were either purged continuously through the solution in the electrochemical glass cell or 20–80 psi of $CO_2$ pressure was applied in an autoclave.

The results are shown in Tables I and II as inhibition measurements after 16 hours unless indicated as otherwise below.

TABLE I

Percent Protection in *MEA by 1,6-Hexanedithiol

| Treatment Concentration (ppmA) | Lean System (Argon) | Rich System ($CO_2$) | Rich System ($CO_2$ & $H_2S$) |
|---|---|---|---|
| 50 | 44 | 90 | / |
| 75 (5 hrs.) | 20 | 85 | 64 |
| 75 (16 hrs.) | 24 | 84 | 39 |
| 75 (25 hrs.) | 24 | 82 | 27 |
| 75 (50 hrs.) | / | 80 | 41 |
| 100 | 50 | 90 | 75 | where ppmA means parts per million of actives, *MEA was 18 weight percent monoethanolamine containing 140 ppm sulfuric acid, 150 ppm oxalic acid, 140 ppm acetic acid, 240 ppm formic acid and 30 ppm sodium chloride in water.

TABLE II

Percent Protection In *DGA by 1,6-Hexanedithiol

| Treatment Concentration (ppmA) | Lean System (Argon) | Rich System ($CO_2$) | Rich System ($CO_2$ & $H_2S$) |
|---|---|---|---|
| 50 | / | 46 | 22 |
| 100 | 20 | 72 | / | where ppmA means parts per million of actives, / indicates that no testing was done under the indicated conditions and where *DGA was 65 weight percent diglycolamine and 35 weight percent deionized water.

Example II

Test conditions similar to those described in Example I were used to obtain the results shown in Tables III–VIII. The results shown in Tables III–VIII are measurements recorded after 16 hours of electrode exposure to the corrosive alkanolamine solutions.

TABLE III

Percent Protection in 18 wt. % *MEA at treatment level of 100 ppmA.

| Treatment | Lean System (Argon) | Rich System ($CO_2$) | Rich System ($CO_2$ & $H_2S$) |
|---|---|---|---|
| 1,3-propanedithiol | 0 | 0 | negative |
| 1-hexanethiol | 0 | 89 | 8 |
| 1,8-octanedithiol | 35 | 89 | / | where ppmA means parts per million of actives, / indicates that no testing was done under the indicated conditions, "negative" indicates that corrosion increased and where *MEA was 18 weight percent monoethanolamine in water containing 140 ppm sulfuric acid, 150 ppm oxalic acid, 140 ppm acetic acid, 240 ppm formic acid and 30 ppm sodium chloride.

TABLE IV

Percent Protection in 50 wt. % *MDEA at treatment level of 100 ppmA.

| Treatment | Lean System (Argon) | Rich System $CO_2$) | Rich System ($CO_2$ & $H_2S$) |
|---|---|---|---|
| 1,6-hexanedithiol | 5 | 83 | 92 | where ppmA means parts per million of actives and *MDEA was 50 weight percent methyldiethanolamine in water containing 1950 ppm formic acid, 940 ppm acetic acid, 370 ppm oxalic acid, 185 ppm lactic acid, 40 ppm propionic acid and 20 ppm sodium chloride.

TABLE V

Percent Protection in 50 wt. % *MDEA at treatment level of 75 ppmA.

| Treatment | Lean System (Argon) | Rich System (CO₂) | Rich System (CO₂ & H₂S) |
|---|---|---|---|
| 1,6-hexanedithiol | 60 | 79 | 80 | where ppmA means parts per million of actives and *MDEA was 50 weight percent methyldiethanolamine in water containing 1950 ppm formic acid, 940 ppm acetic acid, 370 ppm oxalic acid, 185 ppm lactic acid, 40 ppm propionic acid and 20 ppm sodium chloride.

TABLE VI

Percent Protection in 60 wt. % *DGA at treatment level of 100 ppmA.

| Treatment | Lean System (Argon) | Rich System (CO₂) | Rich System (CO₂ & H₂S) |
|---|---|---|---|
| 1,6-hexanedithiol | 9 | 60 | 72 | where ppmA means parts per million of actives, *DGA was 65 weight percent diglycolamine and 35 weight percent deionized water.

TABLE VII

Percent Protection in 35 wt. % *DEA at treatment level of 100 ppmA.

| Treatment | Lean System (Argon) | Rich System (CO₂) | Rich System (CO₂ & H₂S) |
|---|---|---|---|
| 1,6-hexanedithiol | 65 | 88 | 87 |
| 1,8-octanedithiol | / | 98 | / |
| 1-decanethiol | / | 60 | / | where ppmA means parts per million of actives, / indicates that no testing was done under the indicated conditions; and where *DEA was 35 weight percent diethanolamine in deionized water containing 100 ppm formic acid, 240 ppm acetic acid, 360 ppm sodium chloride and 250 ppm sodium sulfate.

TABLE VIII

Percent Protection in 35 wt. % DEA at treatment level of 200 ppmA.

| Treatment | Lean System (Argon) | Rich System (CO₂) | Rich System (CO₂ & H₂S) |
|---|---|---|---|
| 1,4-butanedithiol | 33 | 76 | 44 |
| 1-dodecanethiol | 10 | 54 | 46 | where ppmA means parts per million of actives, *DEA was 35 weight percent diethanolamine in deionized water containing 100 ppm formic acid, 240 ppm acetic acid, 360 ppm sodium chloride and 250 ppm sodium sulfate.

Tables I–VIII demonstrate that thio compounds of this invention, when added to an aqueous alkanolamine solution, inhibits acid gas induced corrosion of metals in contact with the aqueous alkanolamine solution.

Thus, the present invention provides thiol compounds for inhibiting corrosion of metals in contact with aqueous alkanolamine solutions.

The invention also provides aqueous acid gas removal solutions inhibited against acid gas promoted corrosion of metals. The solutions are comprised of an alkanolamine, at least one thiol compound and water.

The invention further provides a method for inhibiting corrosion of metals in contact with aqueous alkanolamine solutions in amine acid gas removal units. The method comprises adding an amount of a thiol compound to an aqueous alkanolamine solution, sufficient to establish a concentration of the composition in the aqueous alkanolamine solution which is effective for the purpose of inhibiting metal corrosion in both the rich and lean portions of an amine acid gas removal unit.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. An aqueous acid gas removal solution inhibited against acid gas promoted corrosion of metals consisting essentially of:
   a) an alkanolamine;
   b) a thiol compound, effective as a corrosion inhibitor, having the formula:

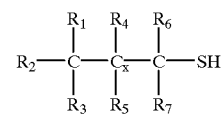

wherein x is 2–8; $R_1$ is independently H, SH, $C_1$ to $C_6$ alkyl, $C_6$ to $C_{10}$ aryl, $C_3$ to $C_{10}$ cycloalkyl, or $C_7$ to $C_{12}$ aralkyl; $R_{2-7}$ are independently H, $C_1$ to $C_6$ alkyl, $C_6$ to $C_{10}$ aryl, $C_3$ to $C_{10}$ cycloalkyl, or $C_7$ to $C_{12}$ aralkyl; and the total number of carbon atoms in the compound is less than seventeen; and
   c) water.

2. The aqueous acid gas removal solution inhibited against acid gas promoted corrosion of claim 1 wherein said thiol compound is selected from the group consisting of cyclohexanethiol; 3-methyl-1-butanethiol; 1-hexanethiol; 1-heptanethiol; 1-octanethiol; 1-nonanethiol; 1-decanethiol; 1-dodecanethiol; benzylthiol; 3-phenyl-1-butanethiol; 2,5-dimethyl-1,6-hexanedithiol; 1,4-cyclohexanedithiol; 1,4-pentanedithiol; 2,5-hexanedithiol; 1,6- hexanedithiol; 1,8-octanedithiol; 2,5-dimethyl-2,5-hexanedithiol; 1,4-diphenyl-1,4-butanedithiol; and 1,4-cyclohexyl-1,4-butanedithiol.

3. The aqueous acid gas removal solution inhibited against acid gas promoted corrosion of claim 1 wherein said thiol compound is selected from the group consisting of 1-hexanethiol; 1-decanethiol; 1-dodecanethiol; 1,6-hexanedithiol; and 1,8-octanedithiol.

4. The aqueous acid gas removal solution inhibited against acid gas promoted corrosion of claim 1 wherein said solution comprises about 15 to 75 weight percent alkanolamine, less then about 1 weight percent thiol compound and from about 25 to 85 weight percent water with the proviso that the combined weight percentages equal 100 weight percent.

5. An aqueous acid gas removal solution inhibited against acid gas promoted corrosion of metals comprising:
   a) from about 15 to 75 weight percent alkanolamine;
   b) less than about 1 weight percent thiol compound, effective as a corrosion inhibitor, having the formula:

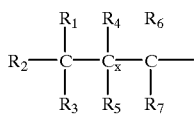

wherein x is 2–8; $R_1$ is independently H, SH, $C_1$ to $C_6$ alkyl, $C_6$ to $C_{10}$ aryl, $C_3$ to $C_{10}$ cycloalkyl, or $C_7$ to $C_{12}$ aralkyl; $R_{2-7}$ are independently H, $C_1$ to $C_6$ alkyl, $C_6$ to $C_{10}$ aryl, $C_3$ to $C_{10}$ cycloalkyl, or $C_7$ to $C_{12}$ aralkyl; and the total number of carbon atoms in the compound is less than seventeen; and c) from about 25 to 85 weight percent water, with the proviso that the combined weight percentages equal 100 weight percent.

6. The aqueous acid gas removal solution inhibited against acid gas promoted corrosion of claim 5 wherein said thiol compound is selected from the group consisting of cyclohexanethiol; 3-methyl-1-butanethiol; 1-hexanethiol; 1-heptanethiol; 1-octanethiol; 1-nonanethiol; 1-decanethiol; 1-dodecanethiol; benzylthiol; 3-phenyl-1-butanethiol; 2,5-dimethyl-1,6-hexanedithiol; 1,4-cyclohexanedithiol; 1,4-pentanedithiol; 2,5-hexanedithiol; 1,6-hexanedithiol; 1,8-octanedithiol; 2,5-dimethyl-2,5-hexanedithiol; 1,4-diphenyl-1,4-butanedithiol; and 1,4-cyclohexyl-1,4-butanedithiol.

7. The aqueous acid gas removal solution inhibited against acid gas promoted corrosion of claim 5 wherein said thiol compound is selected from the group consisting of 1-hexanethiol; 1-decanethiol; 1-dodecanethiol; 1,6-hexanedithiol; and 1,8-octanedithiol.

* * * * *